United States Patent
Kakishima et al.

(10) Patent No.: US 12,156,057 B2
(45) Date of Patent: Nov. 26, 2024

(54) TERMINAL AND COMMUNICATION METHOD FOR RADIO LINK MONITORING

(71) Applicant: NTT DOCOMO, INC., Tokyo (JP)

(72) Inventors: Yuichi Kakishima, Tokyo (JP); Tooru Uchino, Tokyo (JP); Takuma Takada, Tokyo (JP); Xiaolin Hou, Beijing (CN); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 319 days.

(21) Appl. No.: 17/631,237

(22) PCT Filed: Aug. 15, 2019

(86) PCT No.: PCT/JP2019/032076
§ 371 (c)(1),
(2) Date: Jan. 28, 2022

(87) PCT Pub. No.: WO2021/029075
PCT Pub. Date: Feb. 18, 2021

(65) Prior Publication Data
US 2022/0286880 A1    Sep. 8, 2022

(51) Int. Cl.
*H04W 24/08* (2009.01)
*H04L 1/20* (2006.01)
*H04W 56/00* (2009.01)

(52) U.S. Cl.
CPC .............. *H04W 24/08* (2013.01); *H04L 1/203* (2013.01); *H04W 56/001* (2013.01)

(58) Field of Classification Search
CPC ... H04W 24/08; H04W 56/001; H04W 24/02; H04W 88/02; H04L 1/203
See application file for complete search history.

(56) References Cited

U.S. PATENT DOCUMENTS

| | | | | |
|---|---|---|---|---|
| 10,349,324 | B2* | 7/2019 | Tsai | H04W 36/06 |
| 11,025,348 | B2* | 6/2021 | Nam | H04B 7/0417 |
| 11,115,267 | B2* | 9/2021 | Liu | H04W 76/27 |
| 11,838,066 | B2* | 12/2023 | Nam | H04B 17/309 |
| 2014/0043988 | A1* | 2/2014 | Chen | H04L 1/0026 370/252 |
| 2014/0098754 | A1* | 4/2014 | Luo | H04W 72/04 370/329 |
| 2019/0260484 | A1* | 8/2019 | Nam | H04W 24/10 |
| 2020/0059404 | A1* | 2/2020 | Liu | H04W 76/27 |

(Continued)

FOREIGN PATENT DOCUMENTS

| | | | | |
|---|---|---|---|---|
| EP | 3753279 | B1 * | 11/2022 | H04B 17/309 |
| WO | 2019/087228 | A1 | 5/2019 | |

OTHER PUBLICATIONS

International Search Report issued in PCT/JP2019/032076 on Mar. 10, 2020 (5 pages).

(Continued)

*Primary Examiner* — Mounir Moutaouakil
(74) *Attorney, Agent, or Firm* — Osha Bergman Watanabe & Burton LLP

(57) ABSTRACT

A terminal includes a receiver that receives an instruction signal indicating to modify a configuration of a radio link monitoring; and a controller that modifies a parameter used for the configuration of the radio link monitoring in accordance with the instruction signal received by the receiver.

5 Claims, 7 Drawing Sheets

(56) References Cited

U.S. PATENT DOCUMENTS

2022/0039043 A1\* 2/2022 Fujimura .......... H04W 56/0035
2022/0225413 A1\* 7/2022 Yoshioka ............ H04W 72/569
2022/0322122 A1\* 10/2022 Fujimura .............. H04W 4/027

OTHER PUBLICATIONS

Written Opinion of the International Searching Authority issued in PCT/JP2019/032076 on Mar. 10, 2020 (3 pages).
Nokia, Nokia Shanghai Bell; "Radio Link Monitoring In NR"; 3GPP TSG RAN WG1 Meeting 90bis, R1-1718803; Prague, Czech Republic; Oct. 9-13, 2017 (4 pages).
Ericsson; "RLM for HRLLC"; 3GPP TSG-RAN WG4 Meeting #87, R4-1806766; Busan, Korea (Republic of); May 22-25, 2018 (2 pages).
3GPP TS 38.133 V15.6.0; "3rd Generation Partnership Project; Technical Specification Group Radio Access Network; NR; Requirements for support of radio resource management (Release 15)"; Jun. 2019 (999 pages).

\* cited by examiner

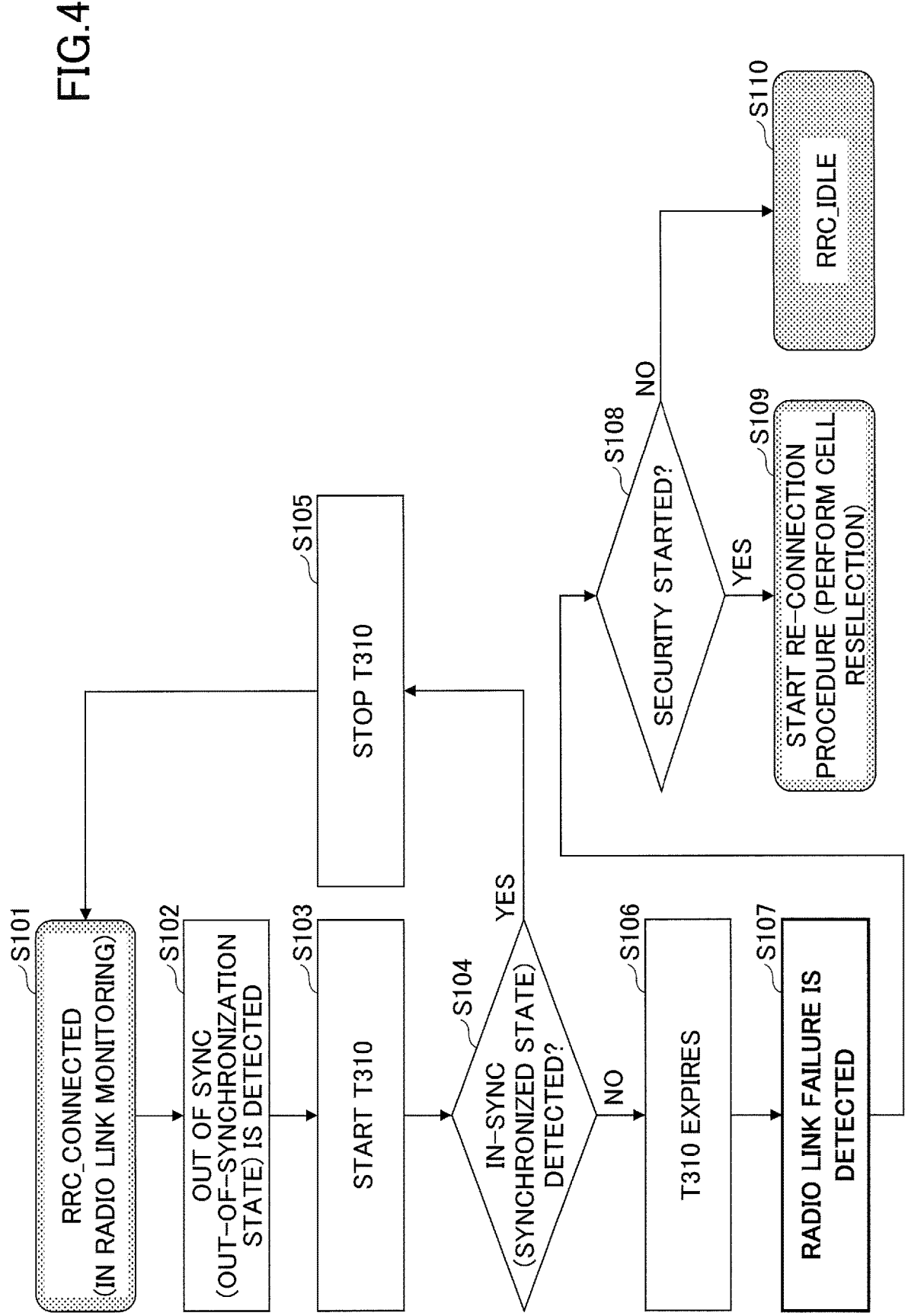

FIG.5

| Attribute | Value for BLER Configuration #0 |
|---|---|
| DCI format | 1-0 |
| Number of control OFDM symbols | 2 |
| Aggregation level (CCE) | 8 |
| Ratio of hypothetical PDCCH RE energy to average SSS RE energy | 4dB |
| Ratio of hypothetical PDCCH DMRS energy to average SSS RE energy | 4dB |
| Bandwidth (MHz) | 24 |
| Sub-carrier spacing (kHz) | SCS of the active DL BWP |
| DMRS precoder granularity | REG bundle size |
| REG bundle size | 6 |
| CP length | Normal |
| Mapping from REG to CCE | Distributed |

| Configuration | $BLER_{out}$ | $BLER_{in}$ |
|---|---|---|
| 0 | 10% | 2% |

…

TERMINAL AND COMMUNICATION METHOD FOR RADIO LINK MONITORING

TECHNICAL FIELD

The present invention relates to a terminal and a communication method in a radio communication system.

BACKGROUND ART

Radio Link Monitoring is a known method performed by a terminal to measure a connection state between the terminal and a base station and report out-of-sync (OOS) or in-sync (IS) to a higher layer (Layer 3). Here, "OOS" is a signal used by the terminal to report, to the higher layer, a case where the connection state between the terminal and the base station becomes worse than a threshold ($Q_{out}$). Additionally, "IS" is a signal used by the terminal to report, to the higher layer, a case where the connection state between the terminal and the base station becomes better than another threshold ($Q_{in}$).

When a state that detects out-of-sync continues for a predetermined period of time or longer, the terminal determines that a radio link failure (RLF) has occurred, i.e., that the connection between the terminal and the base station has stopped.

RELATED ART DOCUMENT

Non-Patent Document

Non-Patent Document 1: 3GPP TS 38.133 V15.6.0 (2019-06)

SUMMARY OF THE INVENTION

Problem to be Solved by the Invention

For example, the radio quality required for URLLC is different from the radio quality required for eMBB. Thus, there is a need for a method that allows a configuration for radio link monitoring to be appropriately changed according to the radio quality required for the communication type.

Means for Solving the Problem

According to an aspect of the present invention, there is provided a terminal including a receiver that receives an instruction signal indicating to change a configuration for a radio link monitoring, and a controller that changes a parameter used in the configuration of the radio link monitoring in accordance with the instruction signal received by the receiver.

Advantage of the Invention

According to an embodiment, there is provided a method that allows a configuration for radio link monitoring to be appropriately changed according to the radio quality required for the communication type.

BRIEF DESCRIPTION OF DRAWINGS

FIG. 4 is a flowchart illustrating an example of a procedure of a terminal to detect a Radio Link Failure (RLF).

FIG. 5 is a diagram illustrating an example of transmission parameters of a PDCCH.

EMBODIMENTS OF THE INVENTION

In the following, embodiments of the present invention are described with reference to the drawings. The embodiments described below are merely examples, and embodiments to which the present invention is applied are not limited to the following embodiments.

In the embodiments of the present invention described below, terms used in existing LTE are used, such as Synchronization Signal (SS), Primary SS (PSS), Secondary SS (SSS), Physical Broadcast channel (PBCH), and Physical Random Access channel (PRACH). This is for convenience of description, and signals and functions similar to these may be referred to by other names. The above-described terms in NR correspond to NR-SS, NR-PSS, NR-SSS, NR-PBCH, NR-PRACH, and the like. However, even if a signal is used for NR, the signal is not always explicitly indicated as "NR-."

In embodiments of the present invention, a duplex method may be a Time Division Duplex (TDD) method, a Frequency Division Duplex (FDD) method, or any other method (e.g., Flexible Duplexing).

In the embodiments of the present invention, "configuring" a radio parameter or the like may be "pre-configuring" a predetermined value, or configuring a radio parameter transmitted from a base station 10 or a terminal 20.

Figure 1:
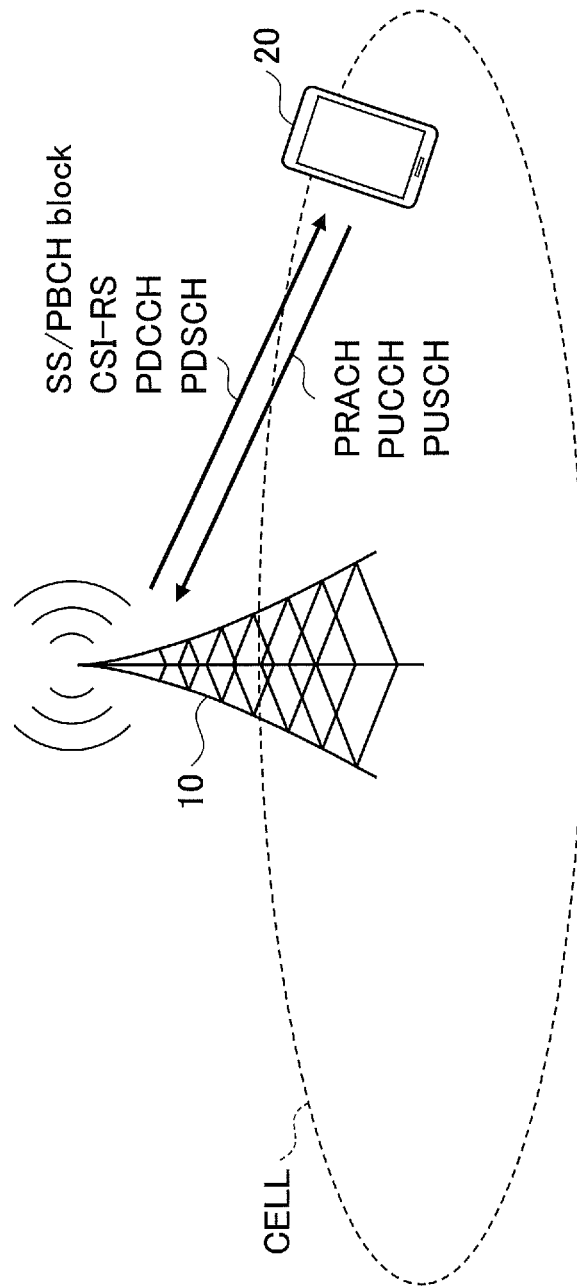
FIG. 1 is a configuration diagram of a communication system according to an embodiment.

FIG. 1 is a diagram illustrating a radio communication system according to an embodiment of the present invention. The radio communication system according to the embodiment of the present invention includes the base station 10 and the terminal 20, as illustrated in FIG. 1. In FIG. 1, one base station 10 and one terminal 20 are illustrated. However, this is an example, and there may be a plurality of base stations 10, and there may be a plurality of terminals 20.

The base station 10 is a communication device that provides one or more cells and performs radio communication with the terminal 20. A physical resource of a radio signal is defined in a time domain and a frequency domain, the time domain may be defined by a number of OFDM symbols, and the frequency domain may be defined by a number of sub-carriers or a number of resource blocks. The base station 10 transmits a synchronization signal and system information to the terminal 20. A synchronization signal is, for example, NR-PSS and NR-SSS. A part of system information is transmitted, for example, by NR-PBCH, which is also called broadcast information. A synchronization signal and broadcast information may be periodically transmitted as an SS block (SS/PBCH block) consisting of a predetermined number of OFDM symbols. For example, the base station 10 transmits a control signal or data in Downlink (DL) to the terminal 20 and receives a control signal or data in Uplink (UL) from the terminal 20. The base station 10 and the terminal 20 are capable of transmitting and receiving signals while performing beamforming. For example, as illustrated in FIG. 1, a reference signal transmitted from the base station 10 includes a Channel State Information Reference Signal (CSI-RS), and a channel transmitted from the base station 10 includes Physical Downlink Control Channel (PDCCH) and Physical Downlink Shared Channel (PDSCH).

The terminal 20 is a communication device provided with a radio communication function, such as a smartphone, a cellular phone, a tablet, a wearable terminal, and a communication module for Machine-to-Machine (M2M). The terminal 20 utilizes various communication services provided by a radio communication system by receiving a control signal or data in DL from the base station 10 and transmitting a control signal or data in UL to the base station 10. For example, as illustrated in FIG. 1, channels transmitted from the terminal 20 include Physical Uplink Control Channel (PUCCH) and Physical Uplink Shared Channel (PUCCH).

In the New Radio (NR), in order to secure coverage for communications using radio waves in a high frequency band, beamforming is applied to transmission of data in a Physical Downlink Shared Channel (PDSCH), transmission of a control signal in a Physical Downlink Control Channel (PDCCH), transmission of a synchronization signal and broadcast information in a Synchronization Signal/Physical Broadcast Channel (SS/PBCH) Block (SSB), and transmission of a reference signal (Channel State Information Signal (CSI-RS)/Demodulation Reference Signal (DMRS)).

For example, in Frequency Range 2 (FR2), i.e., in a frequency band of millimeter wave higher than or equal to 24 GHz, 64 beams can be used, and in Frequency Range 1 (FR1), i.e., in a sub-6GHz frequency band, 8 beams can be used.

(Radio Link Monitoring)

The terminal 20 measures the connection state with the base station 10 and reports out-of-sync (OOS) or in-sync (IS) to the higher layer (Layer 3). Here, "OOS" is a signal reported by the terminal 20 to the higher layer when the connection state between the terminal 20 and the base station 10 becomes worse than a threshold ($Q_{out}$). "IS" is a signal reported by the terminal 20 to the higher layer when the connection state between the terminal 20 and the base station 10 becomes better than another threshold ($Q_{in}$).

Figure 2:
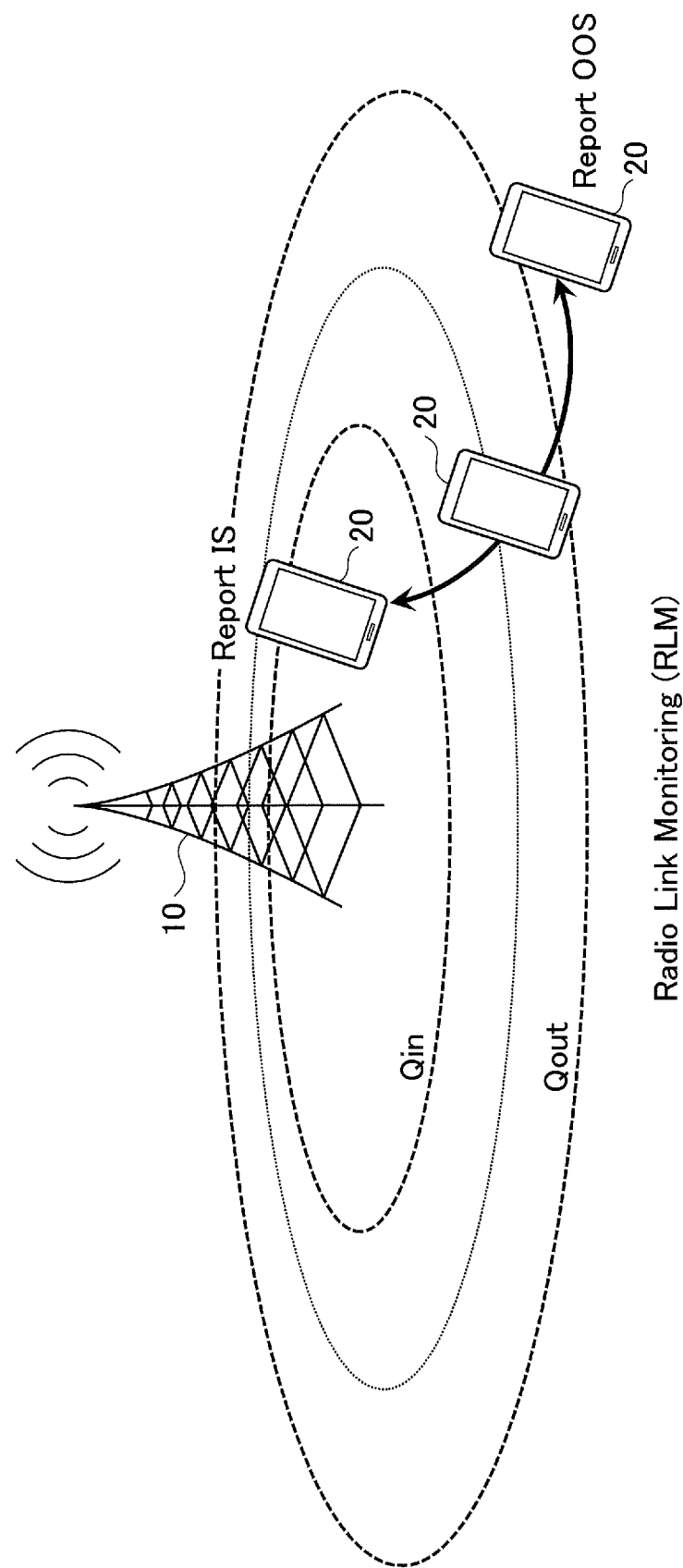
FIG. 2 is a diagram illustrating an example of a case in which a terminal transmits a notification of IS or OOS

FIG. 2 is a diagram illustrating an example where the terminal 20 reports IS or OOS to the higher layer. As illustrated in FIG. 2, for example, it is assumed that the connection state between the terminal 20 and the base station 10 improves as the terminal 20 approaches the base station 10. In this manner, when the connection state between the terminal 20 and the base station 10 becomes better than the threshold Qin, the terminal 20 reports IS to the higher layer. Furthermore, for example, it is assumed that the connection state between the terminal 20 and the base station 10 becomes poor when the terminal 20 moves away from the base station 10 and comes close to the cell edge. In this manner, when the connection state between the terminal 20 and the base station 10 becomes worse than the threshold $Q_{out}$, the terminal 20 reports OOS to the higher layer.

Figure 3:
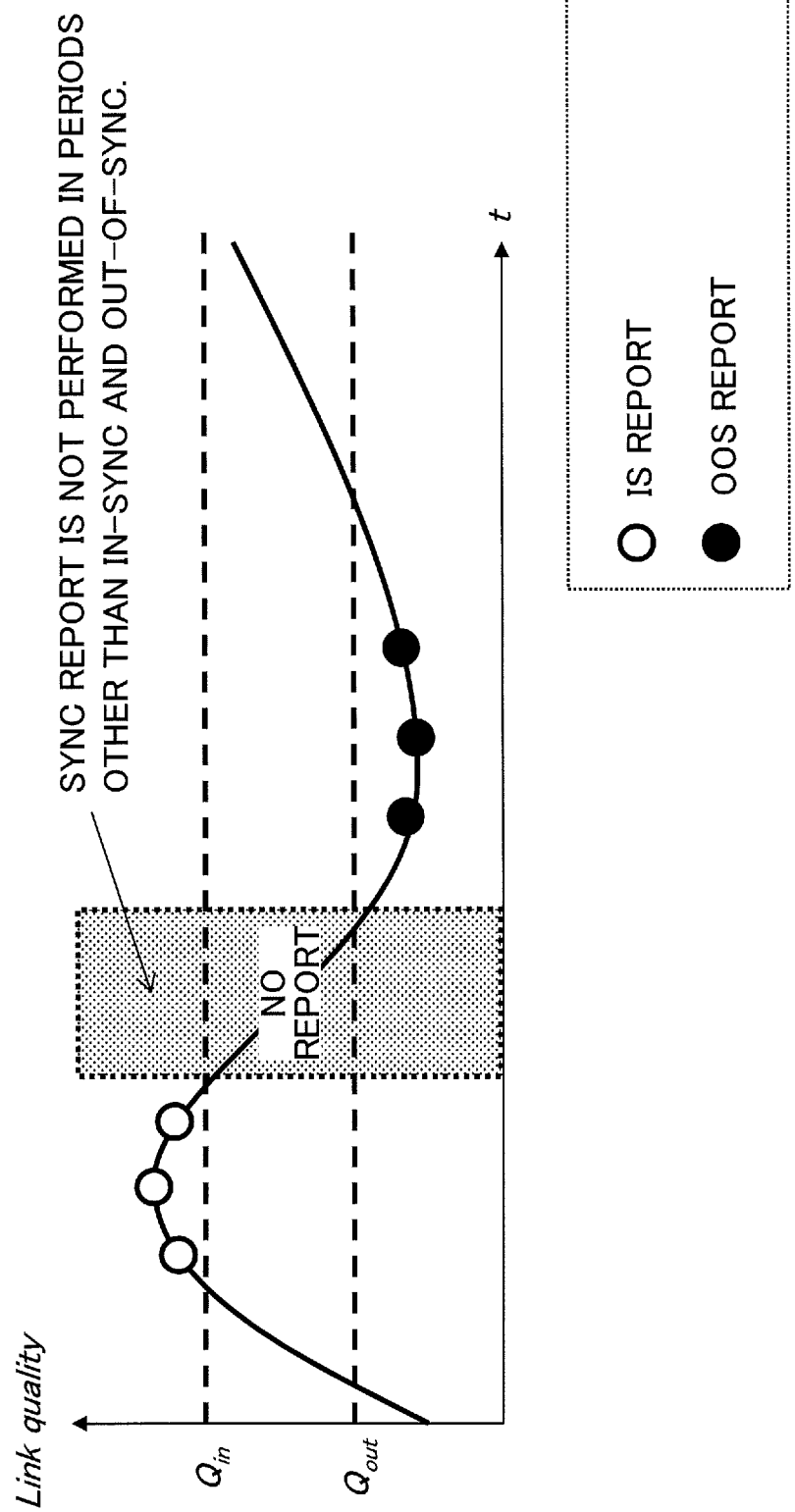
FIG. 3 is a diagram illustrating an example of a state in which a terminal transmits a notification of IS or OOS.

FIG. 3 is a diagram illustrating an example of a state where the terminal 20 reports IS or OOS. The vertical axis of the graph illustrated in FIG. 3 represents link quality, and the horizontal axis represents time. For example, the link quality may be defined based on the block error rate of a PDCCH. As illustrated in the example of FIG. 3, the terminal 20 reports IS when the link quality becomes better than the first threshold $Q_{in}$. Furthermore, the terminal 20 reports OOS when the link quality becomes worse than the second threshold $Q_{out}$. The terminal 20 does not perform a sync report in periods other than in-sync and out-of-sync. When out-of-sync continues to be detected for a given period of time, the terminal 20 determines that a radio link failure (RLF) has occurred, i.e., the connection between the terminal 20 and the base station 10 has stopped.

FIG. 4 is a flowchart illustrating an example of a process where the terminal 20 detects a radio link failure (RLF).

As illustrated in FIG. 4, at step S101, the terminal 20 is in an RRC_CONNECTED state and the terminal 20 is performing radio link monitoring. At step S102, the terminal 20 detects out-of-sync (out-of-synchronization state). In response to detecting out-of-sync at step S102, the terminal 20, at step S103, starts T310 that is a timer indicating a period during which out-of-sync is detected. At step S104, the terminal 20 determines whether in-sync (synchronized state) has been detected. In response to detecting in-sync at step S104, the terminal 20 stops T310 at step S105. If in-sync has not been detected at step S104, the terminal 20 keeps T310 running. Next, at step S106, the terminal 20 detects the expiration of T310. In response to detecting the expiration of T310 at step S106, the terminal 20 detects a radio link failure at step S107. Next, at step S108, the terminal 20 determines whether Security has been started. In response to detecting that Security has been started, the terminal 20 starts a re-connection procedure (performs Cell Reselection) at step S109. When it is detected that Security has not been started, the state of the terminal 20 changes to RRC_IDLE at step S110.

In Release 15 of 3GPP, regarding radio link monitoring, a threshold for determining out-of-sync and a threshold for determining in-sync are specified for an enhanced mobile broadband (eMBB) service. Here, eMBB is a communication type suitable for providing services such as video broadcasting.

In Release 16 of 3GPP, regarding radio link monitoring, a threshold for determining out-of-sync and a threshold for determining in-sync are expected to be specified for an ultra-reliable and low Latency communications (URLLC) service.

Here, URLLC aims to achieve highly-reliable and low-latency communications (ultra-reliable and low-Latency communications). URLLC mainly targets services such as traffic control and remote control that require both of high reliability and low latency. Examples of URLLC use cases include car driving control, traffic control, robot control, three-dimensional connection with, for example, a drone, and remote surgery. In each of the above use cases, high reliability and low latency are required, and it is assumed that a radio system is used mainly for exchanging control signals. For this reason, 5G requires, for URLLC, strict conditions for reliability, low delay, and mobility instead of requiring a high transmission rate and a multi-terminal connection. In 3GPP, regarding URLLC, a radio section latency of less than or equal to 1 ms in transmitting a 32-byte packet and a packet reception success percentage of 99.999% are set as concrete target values to be achieved.

As described above, the radio quality required for URLLC and the radio quality required for eMBB are different from each other.

Accordingly, it is assumed that a configuration for radio link monitoring (e.g., $Q_{in}$ and $Q_{out}$) applied to URLLC need to be different from a configuration for radio link monitoring (e.g., $Q_{in}$ and $Q_{out}$) applied to eMBB.

In the following embodiments, for brevity, an example of applying radio link monitoring to URLLC is described. However, the embodiments are not limited to this example. Radio link monitoring described in the following embodiments may also be applied to communication types other than eMBB and URLLC.

(PDCCH Parameters)

Assuming a case of a PDCCH, a block error rate (BLER) is calculated to derive a threshold Qin for determining in-sync (synchronized state) and a threshold $Q_{out}$ for determining out-of-sync (out-of-synchronization state). FIG. 5 is a diagram illustrating an example of PDCCH transmission parameters assumed to be used to obtain a threshold $Q_{out}$ for determining out-of-sync (out-of-synchronization state) when performing link monitoring based on a synchronization signal block (SSB). That is, the threshold $Q_{out}$ is derived based on an assumption that the PDCCH transmission parameters illustrated in FIG. 5 are used. Then, when the block error rate (BLER) becomes greater than the threshold $Q_{out}$ for a certain period of time, it is determined that out-of-sync (out-of-synchronization state) has occurred. PDCCH transmission parameters for deriving the threshold $Q_{in}$ for detecting in-sync (synchronized state) may also be specified similar to the example illustrated in FIG. 5.

(Target BLER)

Figures 6, 7:
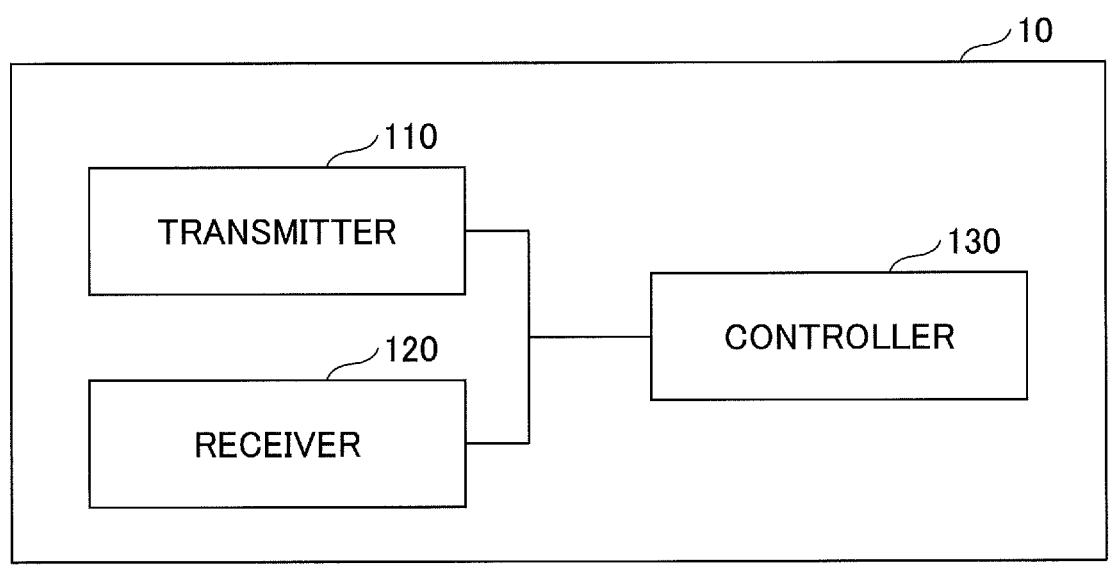
FIG. 6 is a diagram illustrating an example of a Target BLER.
FIG. 7 is a diagram illustrating an example of the functional configuration of a terminal.

As described above, after deriving the threshold Qin for determining in-sync (synchronized state) and the threshold $Q_{out}$ for determining out-of-sync (out-of-synchronization state), a target BLER may be defined, for example, as illustrated in FIG. 6. The terminal 20 may report OOS to the higher layer when the BLER becomes greater than or equal to 10%. Furthermore, the terminal 20 may report IS to the higher layer when the BLER becomes less than or equal to 2%.

(Example of Modified PDCCH Parameters)

The example of PDCCH transmission parameters illustrated in FIG. 5 is based on an assumption that the communication type is eMBB. As described above, the radio quality required for URLLC is different from the radio quality required for eMBB.

Accordingly, a PDCCH transmission parameter table may be defined separately for URLLC.

For example, as a PDCCH transmission parameter for URLLC, the aggregation level may be modified. For example, the aggregation level for URLLC may be set to 16.

For example, as a PDCCH transmission parameter for URLLC, the number of control OFDM symbols may be modified. For example, the number of control OFDM symbols for URLLC may be set at 1.

For example, as a PDCCH transmission parameter for URLLC, the number of control OFDM symbols may be modified. For example, the number of control OFDM symbols for URLLC may be set at 1.

For example, the PDCCH payload size may be changed. For example, a payload size less than downlink control information (DCI) in Release 15 may be used. For example, the payload size to be used may be reported to the terminal 20 via, for example, higher layer signaling (RRC signaling).

For example, various parameters in the table illustrated in FIG. 5 may be modified for URLLC. For example, one or more of the REG bundle size, the bandwidth, and the RE energy in the table illustrated in FIG. 5 may be modified.

For example, the PDCCH transmission parameters applied to the terminal 20 may be switched between the existing PDCCH transmission parameters and the PDCCH transmission parameters for URLLC. For example, switching signaling (for example, RRC signaling) may be defined, and the PDCCH transmission parameters applied to the terminal 20 may be switched according to the switching signaling. As another example, when it is determined that the terminal 20 supports URLLC based on UE capability transmitted from the terminal 20, the base station 10 may instruct the terminal 20 to switch the parameters to the PDCCH transmission parameters for URLLC.

For example, as PDCCH transmission parameters for URLLC, parameters in performing radio link monitoring (RLM) based on an SSB and parameters in performing RLM based on a channel-state information reference signal (CSI-RS) may be defined separately.

Furthermore, for example, for URLLC, as parameters in performing RLM based on an SSB, parameters for deriving the threshold $Q_{in}$ for determining in-sync and parameters for deriving the threshold $Q_{out}$ for determining out-of-sync may be defined separately.

Furthermore, for example, for URLLC, as parameters in performing RLM based on a CSI-RS, parameter for deriving the threshold $Q_{in}$ for determining in-sync and parameters for deriving the threshold $Q_{out}$ for determining out-of-sync may be defined separately.

Furthermore, for example, some of the existing PDCCH transmission parameters (for eMBB) may be used for some of the PDCCH transmission parameters for URLLC.

(Example of modified Hypothetical Parameters)

In Release 15 of 3GPP, PDCCH transmission parameters are defined as parameters for deriving the threshold $Q_{in}$ for determining in-sync (synchronized state) and the threshold $Q_{out}$ for determining out-of-sync (out-of-synchronization state). However, transmission parameters for a different physical channel and/or a different signal may be defined as parameters for deriving the threshold $Q_{in}$ for determining in-sync (synchronized state) and the threshold $Q_{out}$ for determining out-of-sync (out-of-synchronization state).

For example, transmission parameters for a physical downlink shared channel (PDSCH) may be defined as parameters for deriving the threshold $Q_{in}$ for determining in-sync (synchronized state) and the threshold $Q_{out}$ for determining out-of-sync (out-of-synchronization state). For example, a bandwidth, a multiple-input and multiple-output (MIMO) configuration, a PRB bundling size, and a demodulation reference signal (DM-RS) configuration may be defined as PDSCH hypothetical parameters.

When performing RLM, receiving an SSB or a CSI-RS is the first step. Accordingly, for example, the reception quality of an SSB or a CSI-RS may be used as a parameter in performing RLM. For example, as a parameter in performing RLM, reference signal received power (RSRP) or reference signal received quality (RSRP) of the SSB may be used. For example, RSRP or RSRP of the CSI-RS may be used as a parameter in performing RLM.

In Release 15 of 3GPP, the BLER of PDCCH is calculated based on the reception quality of the SSB or the CSI-RS. However, the PDCCH BLER may be calculated based on PDCCH DM-RS instead of SSB and CSI-RS. In this case, for example, transmission parameters of PDCCH DM-RS may be signaled to the terminal 20.

(Method of Modifying Target BLER)

As described above, the radio quality required for URLLC and the radio quality required for eMBB are different from each other. Accordingly, the target BLER may be changed depending on, for example, the communication type.

For example, $BLER_{out}$, which is a BLER threshold for determining out-of-sync (out-of-synchronization state), may be modified. For example, assuming highly-reliable communications according to URLLC, the $BLER_{out}$ may be set at a low value for URLLC (for example, $10^{-3}$, $10^{-4}$, $10^{-5}$, $10^{-6}$, or $10^{-7}$). Furthermore, for example, assuming a scenario such as the cell edge coverage enhancement, the $BLER_{out}$ may be set at a high value (for example, 15%, 20%, 40%, or 50%).

For example, $BLER_{in}$, which is a BLER threshold for determining in-sync (synchronized state), may be modified. For example, assuming highly-reliable communications according to URLLC, the $BLER_{in}$ may be set at a low value for URLLC (for example, $10^{-2}$, $10^{-3}$, $10^{-4}$, $10^{-5}$, or $10^{-6}$). Furthermore, for example, assuming a scenario such as the cell edge coverage enhancement, the $BLER_{in}$ may be set at a high value (for example, 10%, 15%, 20%, or 40%).

For example, the BLER may be specified taking into account the number of repetitions (for example, the BLER may be specified assuming that the number of repetitions is 8). For example, the target BLER for eMBB and the target BLER for URLLC may be the same, and the BLER for URLLC may be defined as a BLER that assumes repetition. The number of repetitions may be determined as dependent on the latency upper bound.

For example, the BLER may be specified taking into account the HARQ repetition (for example, BLER may be defined as the BLER assuming 8 times of HARQ repetitions). For example, the target BLER for eMBB and the target BLER for URLLC may be the same, and the BLER for URLLC may be defined as a BLER that assumes HARQ repetition. The number of repetitions may be determined as dependent on the latency upper bound.

For example, when the packet data convergence protocol (PDCP) duplication is applied, the target BLER may be modified depending on the duplication. For example, the target BLER may be set at 1/N (where N indicates duplication legs).

For example, it may be possible to switch between the existing target BLER and the target BLER for URLLC. For example, switching signaling (for example, RRC signaling) may be defined, and the target BLER applied to the terminal 20 may be switched according to the switching signaling. Furthermore, for example, when it is determined that the terminal 20 supports URLLC based on UE capability transmitted from the terminal 20, the base station 10 may instruct the terminal 20 to switch to the target BLER for URLLC.

For example, as target BLERs for URLLC, a target BLER used when performing radio link monitoring (RLM) based on SSB and a target BLER used when performing RLM based on a channel-state information reference signal (CSI-RS) may be separately defined.

Furthermore, for example, for URLLC, as target BLERs used when performing RLM based on SSB, a target BLER for determining in-sync and a target BLER for determining out-of-sync may be defined separately.

Furthermore, for example, for URLLC, as target BLERs used when performing RLM based on CSI-RS, a target BLER for determining in-sync and a target BLER for determining out-of-sync may be defined separately.

In Release 15 of 3GPP, the standard for RLM is defined using BLER as a reference. However, RLM may be defined using a different reference.

Particularly, because it is extremely difficult for the terminal 20 to observe a low target BLER (it may require many measurement samples), a reference other than BLER may be used. For example, RLM may be defined based on, for example, RSRP, RSRQ, or a signal-to-interference plus noise power ratio (SINR). Furthermore, a parameter (for example, energy per resource element (EPRE)) for calculating the quality may be defined.

For example, when the terminal 20 supports (or uses) eMBB and URLLC, the terminal 20 may use either eMBB-based RLM or URLLC-based RLM. Furthermore, the terminal 20 may use either one of eMBB-based RLM and URLLC-based RLM in response to receiving switching information signaling. Furthermore, the terminal 20 may use both of eMBB-based RLM and URLLC-based RLM (that is, the terminal 20 may use multiple types of RLM).

For example, when the terminal 20 supports (or uses) eMBB and URLLC, and the eMBB RLM timer expires, the terminal 20 may trigger an RLF procedure (RACH procedure).

Furthermore, for example, when the terminal 20 supports (or uses) eMBB and URLLC, and the URLLC RLM timer expires, the terminal 20 may report that a problem has occurred in the URLLC traffic radio link. When the terminal 20 supports only URLLC traffic, the terminal 20 may or may not trigger the RLF procedure (RACH procedure).

For example, when the terminal 20 supports (or uses) eMBB and URLLC and both of the eMBB RLM timer and the URLLC RLM timer expire, the terminal 20 may trigger the RLF procedure (RACH procedure).

In the above embodiment, as an example of RLM switching, an example of switching PDCCH transmission parameters for URLLC is described. Although an explicit method for the RLM switching is described, the embodiment is not limited to this example. For example, RLM switching may be performed by an implicit method. For example, the terminal 20 may switch RLM depending on the DCI format. For example, the terminal 20 may switch the RLM depending on a modulation and coding scheme (MCS) table. For example, the terminal 20 may switch the RLM depending on whether the PDSCH repetition is applied. For example, the terminal 20 may switch the RLM depending on whether the configured grant is applied. F or example, the terminal 20 may switch the RLM depending on whether the pre-emption is applied.

(Device Configuration)

Next, an example of the functional configuration of the base station 10 and the terminal 20 for performing the processes and operations described above is described. The base station 10 and the terminal 20 include functions for implementing the above-described embodiments. However, each of the base station 10 and the terminal 20 may include only some of the functions in the embodiments.

<Base Station Apparatus 10>

FIG. 7 is a diagram illustrating an example of the functional configuration of the base station 10. As illustrated in FIG. 7, the base station 10 includes a transmitter 110, a receiver 120, and a controller 130. The functional configuration illustrated in FIG. 7 is merely one example. The functional division and names of functional units may be any division and names, provided that the operations according to the embodiments of the present invention can be performed.

The transmitter 110 includes a function for generating a transmit signal from transmit data, and the transmitter 110 transmits the transmit signal through radio. The receiver 120 receives various types of signals through radio, and the receiver 120 obtains a higher layer signal from the received physical layer signal. Furthermore, the receiver 120 includes a measurement unit that performs measurement of a received signal to obtain received power, and so forth.

The controller 130 controls the base station 10. Note that a function of the controller 130 related to transmission may be included in the transmitter 110 and a function of the controller 130 related to reception may be included in the receiver 120.

For example, in response to determining, based on the UE capability received by the receiver 120, that the terminal 20 supports URLLC, the controller 130 of the base station 10 may create instruction information for switching from a parameter for deriving a threshold value $Q_{in}$ for determining In-sync (a synchronous state) and a threshold value $Q_{out}$ for determining Out-of-sync (out of synchronization) in the terminal 20 to a parameter for URLLC, and the transmitter 110 may transmit the instruction information to the terminal 20.

<Terminal 20>

Figure 8:
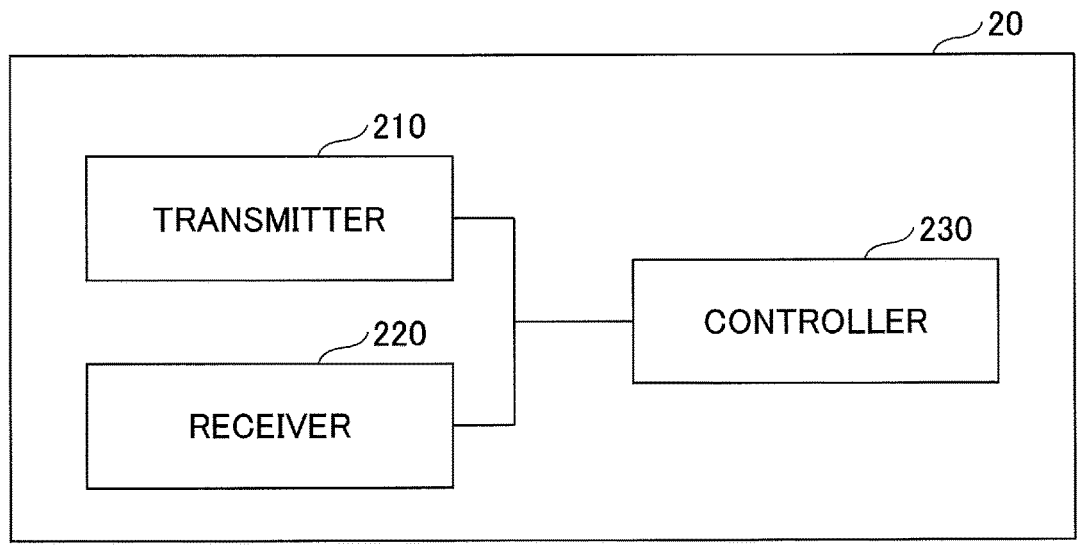
FIG. 8 is a diagram illustrating an example of the functional configuration of a base station.

FIG. 8 is a diagram illustrating an example of the functional configuration of the terminal 20. As illustrated in FIG. 8, the terminal 20 includes a transmitter 210, a receiver 220, and a controller 230. The functional configuration illustrated in FIG. 8 is merely an example. The functional division and names of functional units may be any division and names, provided that the operation according to the embodiments can be performed.

The transmitter 210 includes a function for generating a signal to be transmitted to the base station 10 and transmitting the signal through radio. The receiver 220 includes a function for receiving various types of signals transmitted from the base station 10 and obtaining, for example, higher layer information from the received signals. The receiver 220 includes a measurement unit that measures a received signal to obtain a received power.

The controller 230 controls the terminal 20. The function of the controller 230 related to transmission may be included in the transmitter 210, and the function of the controller 230 related to reception may be included in the receiver 220.

For example, the transmitter 210 of the terminal 20 may transmit, to the base station 10, UE capability including information indicating that the terminal 20 supports URLLC. For example, the receiver 220 of the terminal 20 may receive an instruction signal transmitted from the base station 10, and the controller 230 of the terminal 20 may switch from a parameter for deriving a threshold value $Q_{in}$ for determining In-sync (a synchronous state) and a threshold value $Q_{out}$ for determining Out-of-sync (out of synchronization) in the terminal 20 to a parameter for URLLC, in accordance with the instruction signal.

<Hardware Configuration>

The block diagrams (FIG. 7 to FIG. 8) used in describing the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

Figure 9:
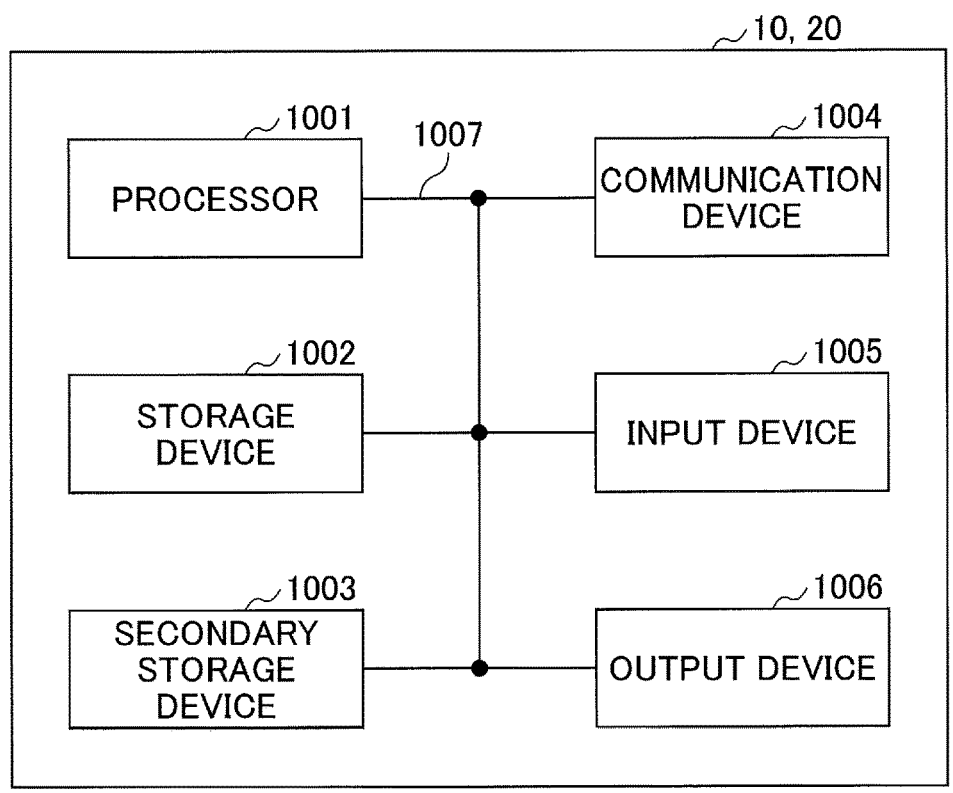
FIG. 9 is a diagram illustrating an example of the hardware configuration of the terminal and the base station.

For example, the base station 10 and the terminal 20 according to an embodiment of the present invention may function as computers performing the process of the radio communication according to the embodiment of the present invention. FIG. 9 is a diagram illustrating an example of a hardware configuration of the base station 10 and the terminal 20 according to the embodiment. Each of the above-described base station 10 and terminal 20 may be physically configured as a computer device including a processor 1001, a storage device 1002, a secondary storage device 1003, a communication device 1004, an input device 1005, an output device 1006, a bus 1007, and so forth.

Note that, in the following description, the term "device" can be replaced with a circuit, a device, a unit, and so forth. The hardware configuration of the base station 10 and the terminal 20 may be configured to include one or more of the devices depicted in the figure, which are indicated by 1001 through 1006, or may be configured without some devices.

Each function of the base station 10 and the terminal 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the secondary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and so forth.

Additionally, the processor 1001 reads a program (program code), a software module, data, or the like from at least one of the secondary storage device 1003 and the communication device 1004 to the storage device 1002, and executes various processes according to these. As the program, a program is used which causes a computer to execute at least a part of the operations described in the above-described embodiment. For example, the controller 130 of the base station 10 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and the like. The storage device 1002 may be referred to as a register, a cache, a main memory (main storage device), or the like. The storage device 1002 may store a program (program code), a software module, and so forth, which can be executed for implementing the radio communication method according to the embodiments of the present disclosure.

The secondary storage device 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, and so forth. The secondary storage device 1003 may be referred to as an auxiliary storage device. The above-described storage medium may be, for example, a database including at least one of the storage device 1002 and the secondary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, and the like, to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the storage device 1002, is also connected by the bus 1007 for communicating information. The bus 1007 may be formed of a single bus or may be formed of different buses between devices.

The base station 10 and the terminal 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

(Conclusion of the Embodiments)

In this specification, at least the user equipment and the communication method described below are disclosed.

A terminal including a receiver that receives an instruction signal indicating to modify a configuration of a radio link monitoring, and a controller that modifies a parameter used in the configuration of the radio link monitoring in accordance with the instruction signal received by the receiver.

According to the above-described configuration, a parameter used for the configuration of radio link monitoring can be modified according to communication types such as URLLC and eMBB that require different levels of radio quality.

The instruction signal may be for indicating to switch the configuration of the radio link monitoring to a configuration of a radio link monitoring for Ultra-Reliable and Low Latency Communications (URLLC); and the controller may switches a transmission parameter of a physical downlink control channel (PDCCH) for deriving a first threshold for determining a synchronized state and a second threshold for determining an out-of-synchronization state to a transmission parameter of a PDCCH for URLLC in accordance with the instruction signal.

According to the above-described configuration, when the communication type is URLLC, a threshold for determining out-of-sync and a threshold for determining in-sync for URLLC can be set.

The instruction signal may be for indicating to switch the configuration of the radio link monitoring to a configuration of a radio link monitoring for Ultra-Reliable and Low Latency Communications (URLLC); and the controller may switch a first block error rate for determining a synchronized state and a second block error rate for determining an out-of-synchronization state to a first block error rate for determining the synchronized state and a second block error rate for determining the out-of-synchronization state for URLLC in accordance with the instruction signal.

According to the above-described configuration, when the communication type is URLLC, a block error rate for determining out-of-sync and a block error rate for determining in-sync for URLLC can be set.

The instruction signal may be for indicating to start enhanced Mobile Broadband (eMBB) based radio link monitoring and Ultra-Reliable and Low Latency Communications (URLLC) based radio link monitoring, and the controller may start the eMBB-based radio link monitoring and the URLLC-based radio link monitoring in accordance with the instruction signal.

According to the above-described configuration, the terminal can perform different types of radio link monitoring for eMBB and URLLC.

(Supplemental Embodiments)

While the embodiments of the present invention are described above, the disclosed invention is not limited to the described embodiments, and those skilled in the art will appreciate various alterations, modifications, alternatives, and substitutions. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station 10 and the terminal 20 are described using functional block diagrams, but such devices may be implemented in hardware, software, or a combination thereof. Software operated by a processor included in the base station 10 in accordance with embodiments of the present invention and software operated by a processor included in the terminal 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary sequence and are not limited to the particular sequence presented.

The particular operation described in this disclosure to be performed by the base station 10 may be performed by an upper node in some cases. It is understood that in a network formed of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like, which may be referred to throughout the above description, may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," and "terminal" may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user terminals (e.g., may be referred to as Device-to-Device (D2D) or Vehicle-to-Everything (V2X)). In this case, a configuration may be such that the above-described function of the terminal 20 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel. Similarly, the user terminal according to the present disclosure may be replaced with a base station. In this case, a configuration may be such that, the function included in the above-described user terminal 20 may be included in the terminal 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access." As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in the present specification. The present invention may be implemented as modifications and variations without departing from the gist and scope of the disclosure as defined by claims. Accordingly, the description of the present specification is for illustrative purposes only and is not intended to have any restrictive meaning with respect to the present invention.

LIST OF REFERENCE SYMBOLS 10 base station
110 transmitter
120 receiver
130 controller
20 terminal
210 transmitter
220 receiver
230 controller
1001 processor
1002 storage device
1003 secondary storage device
1004 communication device
1005 input device
1006 output device

The invention claimed is:

1. A terminal comprising:
a receiver that receives an instruction signal indicating to modify a configuration of a radio link monitoring; and
a controller that modifies a parameter used in the configuration of the radio link monitoring in accordance with the instruction signal received by the receiver,
wherein the instruction signal is for indicating to start enhanced Mobile Broadband (eMBB) based radio link monitoring and Ultra-Reliable and Low Latency Communications (URLLC) based radio link monitoring and a block error rate threshold for determining a synchronized state is different between eMBB based radio link monitoring and URLLC based radio link monitoring.

2. The terminal according to claim 1, wherein
the instruction signal is for indicating to switch the configuration of the radio link monitoring to a configuration of a radio link monitoring for URLLC; and
the controller switches a transmission parameter of a physical downlink control channel (PDCCH) for deriving a first threshold for determining a synchronized state and a second threshold for determining an out-of-synchronization state to a transmission parameter of a PDCCH for URLLC in accordance with the instruction signal.

3. The terminal according to claim 1, wherein
the instruction signal is for indicating to switch the configuration of the radio link monitoring to a configuration of a radio link monitoring for URLLC; and
the controller switches a first block error rate for determining a synchronized state and a second block error rate for determining an out-of-synchronization state to a first block error rate for determining the synchronized state and a second block error rate for determining the out-of-synchronization state for URLLC in accordance with the instruction signal.

4. The terminal according to claim 1, wherein
the controller starts the eMBB-based radio link monitoring and the URLLC-based radio link monitoring in accordance with the instruction signal.

5. A communication method performed by a terminal, the communication method comprising:
receiving an instruction signal indicating to modify a configuration of a radio link monitoring; and
modifying a parameter used for the configuration of the radio link monitoring in accordance with the received instruction signal,
wherein the instruction signal is for indicating to start enhanced Mobile Broadband (eMBB) based radio link monitoring and Ultra-Reliable and Low Latency Communications (URLLC) based radio link monitoring and a block error rate threshold for determining a synchronized state is different between eMBB based radio link monitoring and URLLC based radio link monitoring.

* * * * *